United States Patent
Porikli

(10) Patent No.: US 8,385,632 B2
(45) Date of Patent: Feb. 26, 2013

(54) SYSTEM AND METHOD FOR ADAPTING GENERIC CLASSIFIERS FOR OBJECT DETECTION IN PARTICULAR SCENES USING INCREMENTAL TRAINING

(75) Inventor: Fatih M. Porikli, Watertown, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 456 days.

(21) Appl. No.: 12/791,786

(22) Filed: Jun. 1, 2010

(65) Prior Publication Data

US 2011/0293136 A1    Dec. 1, 2011

(51) Int. Cl.
G06K 9/00    (2006.01)
(52) U.S. Cl. ........................................ 382/159
(58) Field of Classification Search ................. None
See application file for complete search history.

(56) References Cited

U.S. PATENT DOCUMENTS

| | | | |
|---|---|---|---|
| 7,117,185 B1 | 10/2006 | Aliferis | |
| 7,359,555 B2 * | 4/2008 | Porikli et al. | 382/204 |
| 7,587,064 B2 | 9/2009 | Owechko | |
| 7,593,934 B2 | 9/2009 | Li | |
| 2007/0019073 A1 * | 1/2007 | Comaniciu et al. | 348/148 |
| 2010/0066761 A1 * | 3/2010 | Tousch et al. | 345/629 |
| 2011/0254950 A1 * | 10/2011 | Bibby et al. | 348/135 |

* cited by examiner

*Primary Examiner* — Vikkram Bali
(74) *Attorney, Agent, or Firm* — Gene Vinokur; Dirk Brinkman

(57) ABSTRACT

A generic classifier is adapted to detect an object in a particular scene, wherein the particular scene was unknown when the classifier was trained with generic training data. A camera acquires a video of frames of the particular scene. A model of the particular scene model is constructed using the frames in the video. The classifier is applied to the model to select negative examples, and new negative examples are added to the training data while removing another set of existing negative examples from the training data based on an uncertainty measure. Selected positive examples are also added to the training data and the classifier is retrained until a desired accuracy level is reached to obtain a scene specific classifier.

18 Claims, 3 Drawing Sheets

SYSTEM AND METHOD FOR ADAPTING GENERIC CLASSIFIERS FOR OBJECT DETECTION IN PARTICULAR SCENES USING INCREMENTAL TRAINING

FIELD OF THE INVENTION

This invention relates generally to computer vision, and more particularly to adapting a general object classifier to a particular scene to detect moving objects, specifically humans.

BACKGROUND OF THE INVENTION

Most training methods for detecting or classifying objects in video frames are trained by providing labeled example frames of a video. After the classier is trained, known test frames can be processed to determine a performance accuracy of the classifier.

Such methods perform well when training and testing is done in similar conditions, such as on the same scene. However, conditions often change because training and deployment can be in different scenes with widely varying illumination, camera position, apparent object sizes, and pose of the object. That is, often it can not be determined beforehand to what types of scene the classier will be applied.

It is object of the invention to adapt a general classifier to a particular scene, which is a particular scene that was unknown or not available when the classifier was trained.

SUMMARY OF THE INVENTION

In many computer vision tasks, scene changes hinder the ability of generically trained classifiers. For example, a classifier trained for human detector with one set of frames is unlikely to perform well in different scene conditions.

Therefore, the embodiments of the invention provide an incremental training method and system for (human) object detection that can take generic training data and adapt a classifier to a different particular scene.

In an autonomous mode, the first few frames of a video, while there is no human present in the particular scene are used for the adaptation, i.e., the particular scene is substantially stationary. In most cases, a single frame of the background scene is sufficient. With the assistance of a user, an active training mode can be used when the first few frames are not stationary.

DETAILED DESCRIPTION OF THE PREFERRED EMBODIMENTS

Figure 1A:
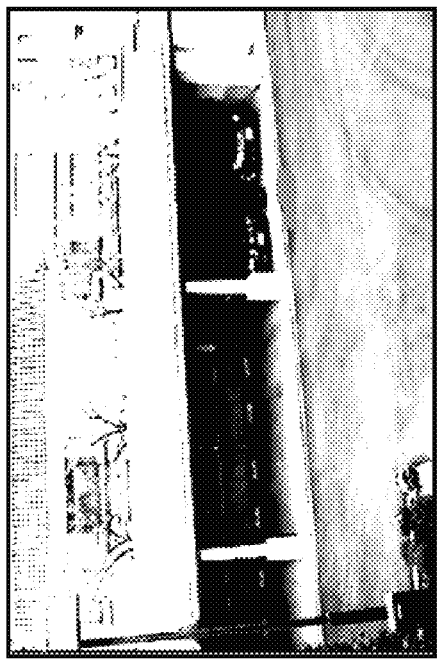
FIG. 1A is a video frame of a particular scene to which a classifier for detecting object is to be adapted according to embodiments of the invention.

FIG. 1A shows a particular scene in which a human is to be detected according to embodiments of our invention. It is an object of our invention to adapt a generically trained classifier to detect objects in the particular scene, which was unknown when the generic classifier was trained with generic training data.

Figure 1B:
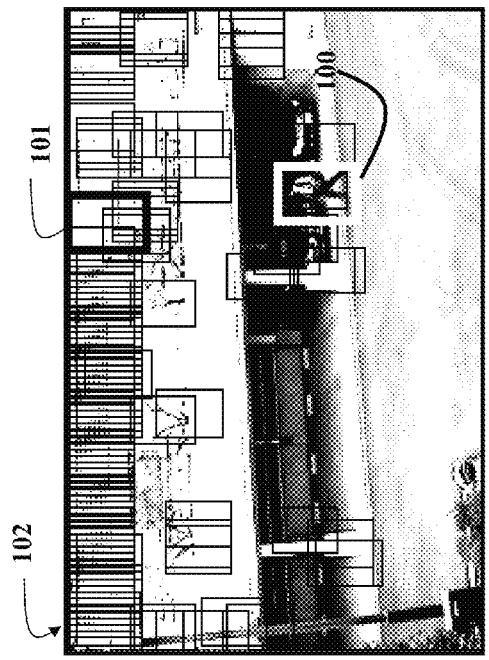
FIG. 1B is a video frame including windows that an unadapted classifier identified as containing human objects.

As shown in FIG. 1B, we use a sliding window 101 of 75×50 pixels, with a horizontal and vertical overlap of 50×30 pixels, respectively, for each frame 102 of a test video. The window is passed over the frame in a raster scan order. Histogram of gradient (HOG) features are extracted for each window to construct a feature vector. The feature vector is passed to a trained classifier, e.g., a generic support vector machine (SVM), to detect humans in the particular scene. It should be noted that other classifiers, such as multi-class classifiers, can also be used.

Each window that is shown in the FIG. 1B indicates a positive classifier output. FIG. 1B shows an extremely large number of false positive detections, primarily due to misleading texture in the upper left part of the frame. Thus, generically trained object classifiers do not generalize well, and heavily rely on the specifics of the training examples.

Typically, the background in the particular scene is not known or unavailable during training. Consequently, parts of the background are often wrongly classified as being human in a frame acquired of the particular scene.

On the other hand, we can also see that the window including the human 100 is detected correctly in the frame in FIG. 1B. Therefore the classifier correctly captures some aspects of the detection problem, specifically, the appearance of the human.

Motivated by the partial correctness of the trained classifier, our objective is to adapt the classifier to the particular scene efficiently and quickly, i.e., with little or no user input.

The goal is to retain informative aspects of previous training example, while also gathering more information about the classification task for the particular scene, thereby constructing a scene-specific classifier from a generic classifier.

We focus on the application of human detection, which is important in most surveillance applications. However, our method can also be applied to other detection and object tracking tasks. Broadly, our method works by performing incremental updates by selecting new examples for training and removing old uninformative examples. The removal of the uninformative examples enables us to maintain a training dataset of a fixed size, so training is efficient, and can work with fixed memory and real-time processing requirements.

Method

Figure 2:
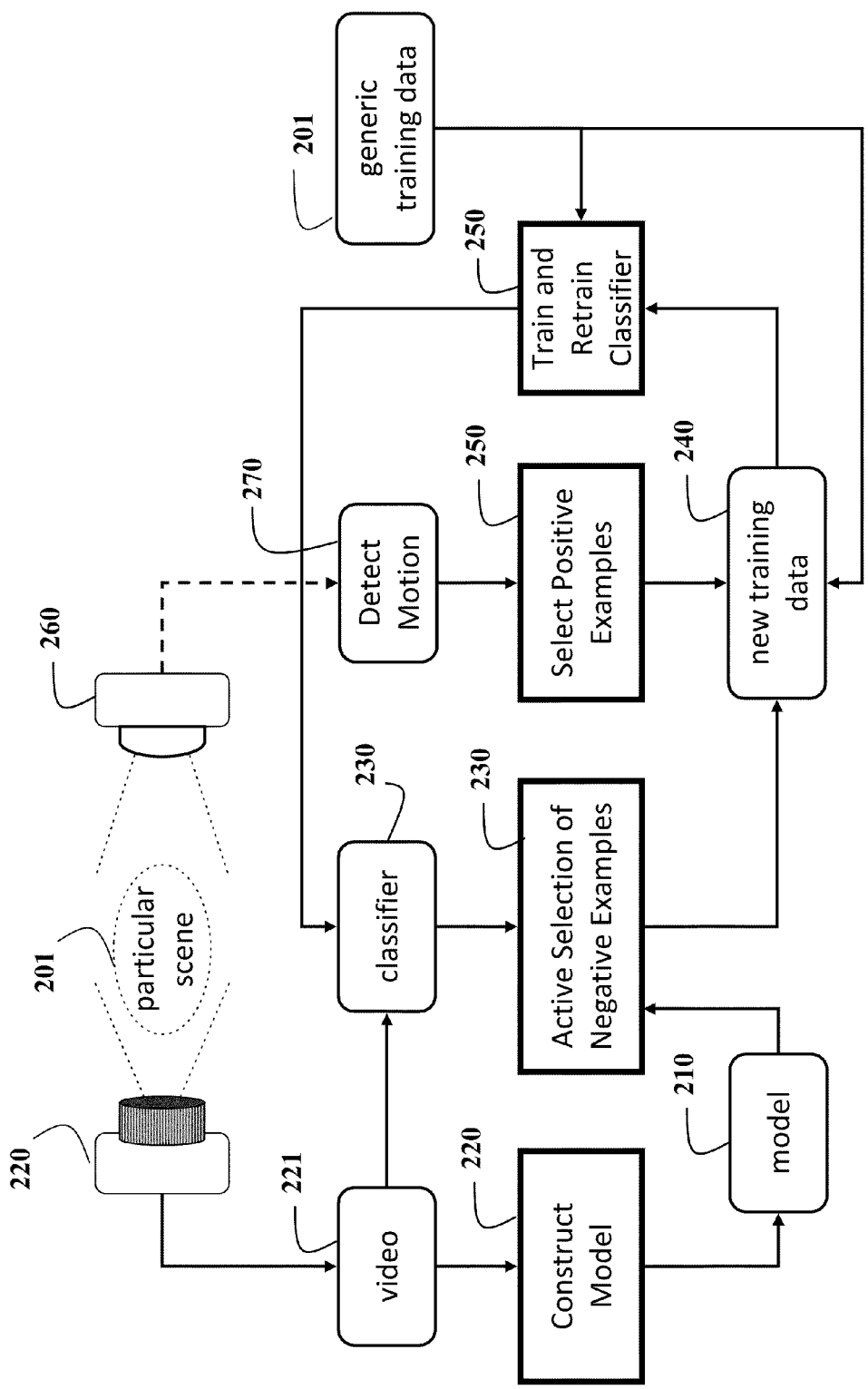
FIG. 2 is a flow diagram of a method for adapting the classifier to the particular scene according to embodiments of the invention.

FIG. 2 shows the steps of the method in greater detail. The steps of the method can be performed in a processor including memory and input/output interfaces as known in the art.

A video 221 of a particular scene 201 is acquired by a camera 220. A model 210 of the scene model is constructed 220 using the video. The classifier 230 is applied to the model to select 430 negative examples.

Initially, the classifier 230 is generic, e.g., a support vector machine (SVM), a cascaded classifier, or a multi-class classifier, The classifier is adapted to be a scene specific classifier, which can be used to detect object, such as humans, in a particular scene, which was unknown when the classifier was initially trained using a large set of generic example training frames from well known generic datasets, such as the National de Recherche en Informatique et en Automatique (INRIA) person data, or the Center for Biological & Computational Learning (CBCL) at Massachusetts Institute of Technology (MIT) pedestrian dataset. Both data sets include a large set of labeled training frames, and unlabeled test frames, that are extensively used in the computer vision community to train classifiers for human object detection, and similar applications. However, the particular scenes in which the objects reside is unknown when the generic classifier was trained.

A subset of the new negative examples are added to the training data while removing another set of existing negative examples from the training data based on an uncertainty measure to produce new training data 440. Similarly, positive examples are added to the training data. This maintains the data set at a fixed size.

Then, the classifier is retrained 250 with the new training data 440. The selecting, adding, and training steps are repeated until a desired accuracy level is reached.

In an alternative embodiment, a motion sensor 260 can be used to detect motion 270 in the particular scene, which triggers the selection 250 of the positive examples. When motion is detected, the frames are marked as motion frames. Frame differencing is applied to the frames before, while and after the motion is detected. Regions in the frames that have largest difference values are determined and object size windows are fitted to the grouped pixels where the windows are the new positive examples.

In a semi-supervised mode, a user participates during the training to provide optional user input data. Then, the method adapts to the particular scene based on a few queries made to the user, such as showing a frame window and querying whether the window includes an object, or not. This mode can be used for more challenging environments where human appearance may differ significantly, or where empty (motion free) frames are not available for autonomous adaptation.

An autonomous mode uses the generic data in the generic data set and the first few frames from the video of the particular scene, which does not contain any motion—just background, to train our scene-specific classifier 230. In this mode, the first few empty frames, e.g., one or two, can be used for automatic background subtraction 270.

Adaptation with User in the Loop

Active Training

We give a short overview of active training, followed by our active selection method. The basic idea in active training is to query the user for "informative examples," so as to train faster than passive methods, i.e., with fewer training examples. Active training has been employed in a number of computer vision applications, see e.g., U.S. Pat. Nos. 7,593,934, and 7,587,064.

The active selection process is usually iterative, wherein the procedure queries the user for a label on selected unlabeled examples, obtains user feedback, and appends the now labeled example to the training set. The classifiers are retrained 250 during each repetition, and the process is repeated until a desired accuracy level is reached, or until no more training data are available.

Through intelligent query selection, active training can train a generic classifier with very few training examples. The most crucial aspect in active training is the query selection mechanism. Measuring the potential informativeness, in terms of future classification rate, of unlabeled examples is difficult, as is the case for query selection.

Most methods use proxies such as uncertainty sampling, i.e., selecting examples for which the current classifier is most uncertain, or in other words the most uncertain examples. For example, for the SVM classifier 240, examples closest to the classification boundary are uncertain and can be potentially informative if labeled. We focus on uncertainty sampling.

Incremental Training and Forgetting

In this section, we employ active training and forgetting for incremental training. The main idea is that given a set of generic labeled training frames, new informative frames from the scene of deployment can be queried to the user for adding to the training set, while old uninformative frames can be removed. The selection (adding) and deletion (forgetting) processes both work through active selection. For deletion, the active selection measure is inverted, i.e., examples which are least informative are selected.

To our knowledge, this is the first work that employs active forgetting, and combines active forgetting with active training for incremental classifier training.

As shown in FIG. 2, given the particular scene 201 for deployment, along with the generic labeled training data, the method queries the user selects and adds a few training examples frames from the new frame. The training data are used to adapt the classifier to the particular scene.

At the same time, old uninformative data are removed from the training set, thus maintaining the memory required at a fixed size, and enabling real-time processing. As the examples to be removed are selected actively, they are relatively uninformative and the removal does not significantly decrease accuracy.

This process is performed iteratively, and results in a trained classifier that is scene-specific, achieved by adapting the generic training data with a small amount of user input. In general, in particular scenes, the first few frames of video, e.g., one or two, can be used for performing the update, and the resulting classifier can then be deployed at the particular scene.

Uncertainty-Based Selection Measure

The selection measure we employ is based on distance to a hyperplane of the SVM classifier. In particular, after the SVM is trained, the SVM is used to estimate class membership probability values for the unlabeled frames. We give a brief overview of the probability estimation technique below.

Probability Estimation Based on Margins

In order to obtain estimates of the class membership probability from margins, we use a modified version of Platt's Sequential Minimal Optimization (SMO) procedure, see U.S. Pat. No. 7,117,185, to extract probabilistic outputs from the SVM. The basic idea is to approximate the class probability using a sigmoid function.

Our feature vectors are $x_i$, $y_i \in 2$ $\{-1, 1\}$ are corresponding labels for the vectors, and $f(x)$ is a decision function of the SVM. The conditional probability of class membership $P(y=1|x)$ can be approximated using $$p(y = 1 \mid x) = \frac{1}{1 + \exp(Af(x) + B)}, \quad (1)$$

where A and B are parameters estimated using a maximum likelihood technique.

The set of labeled training data is L at any instant. Let x be the feature vector of the unlabeled example for which the active selection measure (uncertainty score) is to be. Let y be the true label of x, which is unknown during selection.

We define the selection measure as a difference between the estimated probabilities for the two classes $|P(y=1|L)-P(y=0|L)|$. Thus, active example selection from a large pool A can be formulated as $$x^* = \underset{x_i \in A}{\operatorname{argmin}} |P(y_i = 1 \mid \mathcal{L}) - P(y_i = 0 \mid \mathcal{L})| \quad (2)$$

The above score represents the classifier uncertainty for an unlabeled example. The lower the score, the higher is the uncertainty (smaller margin), and the example is more likely to update the current classifier. We can use the same uncertainty score above, and remove examples having the highest score, indicating that they are farthest away from the classifier boundary.

For the SVM classifier, these examples are not support vectors. Hence, removing the example does not change the accuracy of the classifier. Note that adding new examples might make the removed examples potential support vectors. However, in practice, we observed that this happens extremely rarely. Consequently, example removal using this measure does not decrease the accuracy of the classifier.

For binary classification, the distance to the margin suffices. However, using estimated probability values, we can extend the above method to multi-class classifiers as well. The selection measure for a k-class problem is $$x^* = \underset{x_i \in A}{\operatorname{argmin}} |P(y_{k_1} | \mathcal{L}) - P(y_{k_2} | \mathcal{L})|, \text{ where} \quad (3)$$

$$k_1 = \underset{i=1:k}{\operatorname{argmax}} P(y_i), k_2 = \underset{i=1:k, i \neq k_1}{\operatorname{argmax}} P(y_i).$$

Our method is not intended to replace other detection techniques, but rather to complement them by adding incremental active training. As such, our method can be used with other known techniques that perform well in particular domains, such as classifier cascades, which are known to give good performance in human detection applications.

The above method of semi-supervised adaptation can be applied to many incremental training tasks, even when training and test conditions differ substantially, and no other information is available.

In many human detection applications, more information is available. For example, at the particular scene, we might have access to a few frames of video without any human in the particular scene, i.e., the particular scene is essentially stationary background.

Alternatively, motion sensors are often available in surveillance environments. The motion sensors can be used as a primary sensor to indicate the presence of a frame without a human, i.e., the particular scene is substantially stationary. When the motion sensor detects motion, positive samples can be selected. In this embodiment, we can adapt the generic classifier to the particular scene completely autonomously as follows.

Autonomous Adaptation

In the example of FIG. 1B, there are a large number of false positives. We aim to eradicate false samples, while keeping the correct detection as is. If we have access to the video frames when there is no human in the particular scene, we can use the frame windows from that frame to gather more negative training examples.

Selecting Negative Examples

The number of sliding windows per frame can be very large, because of the small window size and substantial overlap. As such, it is impractical to use all of the windows as negative training examples, from both perspectives of training set size, and retraining time.

In this section, we describe our method of example selection and addition, and removal. The generic classifier 240 is applied to the empty frame, i.e., no human, and all the windows on which the classifier gives a positive response are selected for training.

As the frame is known to be empty, the positive detections are essentially misclassifications by the classifier. Therefore, adding the positive detections to the training data is likely to change the generic classifier to a scene specific classifier, and reduce the number of false positive detections.

The embodiments of the invention construct a model of a particular scene by estimating a background of the particular scene using a Bayesian background update mechanism, and by fitting a set of mixture models to each pixel and selecting a most likely pixel model. From this background, object-sized windows are selected.

Alternatively, for a set of frames from video, differences between pixels in the frames are determined, by grouping the pixels that have small differences, i.e., the grouped pixels represent portions of the particular scene that are substantially stationary. Then, object size windows are fitted to the grouped pixels. In both cases the windows correspond to new negative examples as such windows depict no motion, and the windows are highly likely to not contain any moving objects.

To obtain new positive examples, the motion sensor can be used to detect motion frames with motion. The frame differencing can then only be applied frames before, while and after the motion is detected. In such frame difference maps, regions that have largest difference values indicate moving objects, and thus, new positive examples.

Maintaining Training Set Sizes

On the other hand, adding new training examples increases the size of the training data set. This is undesirable in memory-constrained applications, and where a processing rate is critical, e.g., for real-time human detection. Therefore, we also remove an equal number of old negative examples from the generic training examples. This is accomplished by using the method of the previous section, i.e., removing examples that are farthest away from the boundary.

EFFECT OF THE INVENTION

Figure 3:
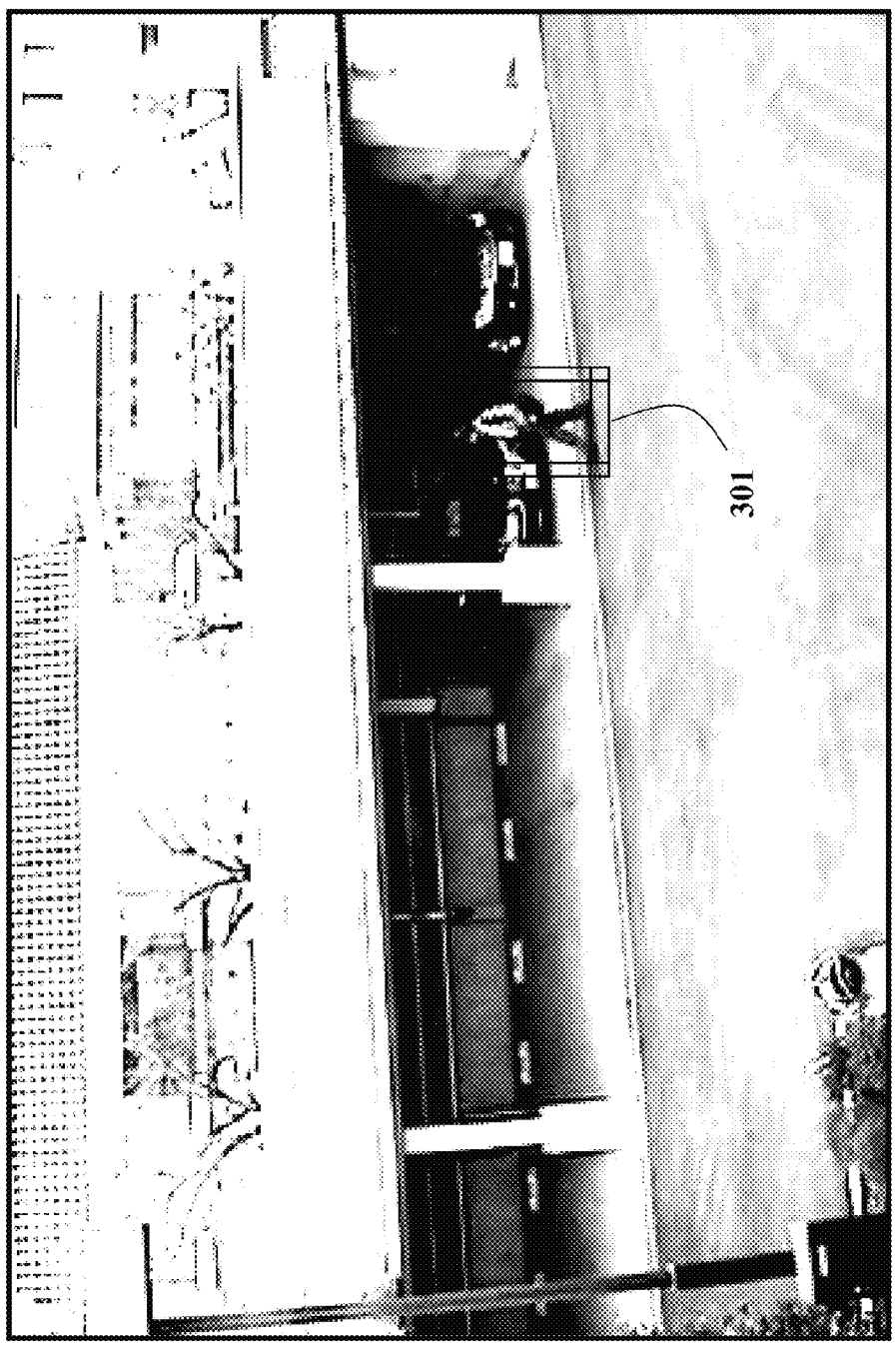
FIG. 3 is a video frame including windows that an adapted classifier identified as containing human objects according to embodiments of the invention.

We provide a completely autonomous mode for adapting a generic classifier for (human) object detector to a particular scene. We also provide a semi autonomous mode where a user is queried for positive and negative example to retrain the classifier. FIG. 3 shows a video frame on which our classifier is applied to correctly identify the window that includes a pedestrian 301.

The method can be used to adapt generic training examples to provide scene-specific object detectors. This enables a quick deployment in particular scenes, without involving expensive operations of data collection at the scene. Using incremental training, the classifiers can combine the advantages of available generic training example as well as scene-specific examples.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

I claim:

1. A method for adapting a classifier to detect an object in a particular scene, wherein the particular scene was unknown when the classifier was trained with training data, comprising the steps of:

acquiring a video of frames of the particular scene with a camera;

constructing a model of the particular scene model using the frames in the video;

applying the classifier to the model to select negative examples;

adding a subset of the new negative examples to the training data while removing another set of existing negative examples from the training data based on an uncertainty measure;
adding selected positive examples to the training data;
retraining the classifier; and
repeating the adding and retraining steps until a desired accuracy level is reached to obtain a scene specific classifier.

2. The method of claim 1, wherein the constructing further comprises:
estimating a background of the particular scene using a Bayesian background update mechanism by fitting a set of mixture models to each pixel in the frames to produce a pixel model; and
selecting a most likely pixel model.

3. The method of claim 1, wherein the model is constructed from the frames by determining frame differences and grouping the pixels that have small difference values, and fitting object size windows to the grouped pixels where the windows are new negative examples.

4. The method of claim 3, further comprising:
detecting motion in the particular scene with a motion sensor;
applying the frame difference to the frames before, while, and after the motion is detected to determine difference values;
determining regions in the frames that have largest difference values; and
fitting object size windows to the grouped pixels where the windows are the new positive examples.

5. The method of claim 1, further comprising:
setting and maintaining the training data to a fixed size according to memory and real-time processing requirements.

6. The method of claim 1, further comprising:
adapting to changes in the particular scene by repeating the retraining if a difference between a current model and a current frame is large.

7. The method of claim 1, further comprising:
adapting a multi-class classifier using the new negatives example.

8. The method of claim 1, further comprising:
retraining the classifier with the new negative examples and the positive examples; and
adding the classifier as a cascade layer in the classifier.

9. The method of claim 1, wherein the training data are initially generic.

10. The method of claim 3, wherein a size of the window is 75×50 pixels, with a horizontal and vertical overlap of 50×30 pixels.

11. The method of claim 1, further comprising:
extracting features from each frame into a feature vector; and
classifying the feature vector.

12. The method of claim 11, wherein the features are histogram of gradients.

13. The method of claim 1, wherein the classifier is a support vector machine.

14. The method of claim 1, wherein the classifier is a multi-class classifier.

15. The method of claim 1, wherein the classifier is initially generic.

16. The method of claim 1, wherein the object is human.

17. The method of claim 1, wherein a user selects selected unlabeled examples during active training.

18. A system for adapting a classifier to detect an object in a particular scene, wherein the particular scene was unknown when the classifier was trained with training data, comprising the steps of:
a camera configured to acquire a video of frames of the particular scene;
means for constructing a model of the particular scene model using the frames in the video;
means for applying the classifier to the model to select negative examples;
means for adding a subset of the new negative examples to the training data while removing another set of existing negative examples from the training data based on an uncertainty measure;
means for adding selected positive examples to the training data; means for retraining the classifier.

* * * * *